United States Patent
Guo et al.

(10) Patent No.: US 8,050,294 B2
(45) Date of Patent: Nov. 1, 2011

(54) METHOD AND SYSTEM FOR TRANSMITTING IN TDM MODE

(75) Inventors: Changwang Guo, Beijing (CN); Jun Li, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 12/515,799

(22) PCT Filed: Nov. 21, 2007

(86) PCT No.: PCT/CN2007/003292
§ 371 (c)(1),
(2), (4) Date: Dec. 14, 2009

(87) PCT Pub. No.: WO2008/061451
PCT Pub. Date: May 29, 2008

(65) Prior Publication Data
US 2010/0098108 A1  Apr. 22, 2010

(30) Foreign Application Priority Data
Nov. 23, 2006  (CN) .......................... 2006 1 0114790

(51) Int. Cl.
*H04J 3/00* (2006.01)
(52) U.S. Cl. .................. 370/475; 370/369; 370/452
(58) Field of Classification Search .................. 370/321, 370/470, 475, 392
See application file for complete search history.

(56) References Cited

U.S. PATENT DOCUMENTS
2007/0064722 A1 * 3/2007 Fang ........................... 370/452

FOREIGN PATENT DOCUMENTS
| | | |
|---|---|---|
| CN | 1841976 | 10/2006 |
| CN | 1848715 | 10/2006 |
| WO | 2004/059927 | 7/2004 |

* cited by examiner

*Primary Examiner* — Ricky Ngo
*Assistant Examiner* — David Oveissi
(74) *Attorney, Agent, or Firm* — Ladas & Parry LLP

(57) ABSTRACT

A method for transmitting data in TDM mode is provided to solve the problem in the prior art that the data processing between a transmitter side and a receiver side could not be real time and the delay time during data transmitting would be longer. The method comprises: packaging TIME DIVISION MULTIPLEXING (TDM) frame head information and data to be sent into a TDM frame at a transmitter side, and transmitting the TDM frame to a receiver side; receiving the TDM frame at the receiver side. With the solution according to the present invention, it is possible to perform real time data processing between the transmitter side and the receiver side and shorten the delay time during data transmitting.

14 Claims, 7 Drawing Sheets

METHOD AND SYSTEM FOR TRANSMITTING IN TDM MODE

FIELD OF THE INVENTION

The present invention relates to the technical field of network transmission, and in particular, to a method and a system for transmitting data in a Time Division Multiplexing mode.

BACKGROUND OF THE INVENTION

With the Time Division Multiplexing (TDM), transmission of different data between multiple devices or multiple users is usually implemented via one shared link, in which data transmission is divided into several time slots, and each user or device occupies a different time slot, so that the maximum utilization efficiency of bandwidth may be implemented.

A typical use of TDM is directed to stream data transmission of different users. Specifically, in practice, different users, e.g., 12.2 k voice users, occupy different time slots during the data transmission, and transmitting and receiving at different time slots correspond to different data buffers, so that multiplexing and demultiplexing of data may be implemented.

However, on the other hand, for some situations, a TDM port device is needed to implement the point-to-point communication between two devices, to facilitate the rapid and direct exchange of internal data.

At present, TDM is widely used for stream data transmission, and a typical solution of the data transmission is that: different users are assigned to different time slots each of which corresponds to a certain buffer; when gaining an access to transmit data, a user writes the data into the buffer and notifies a link to transmit the user's data; a controller continually transmits the data at the corresponding time slot, and inserts idle data for transmission when the data transmission is completed and no further data is to be transmitted; the opposite end continually receives and inserts the data into the corresponding user buffer, and if receiving the idle data, the opposite end discards the idle data and ends receiving.

FIG. 1 is a schematic diagram of a system for transmitting data in a TDM mode.

As shown in FIG. 1, C1, C2, C3 and C4 represent 4 users that transmit data, respectively. D1, D2, D3 and D4 represent 4 users that receive data, respectively. C1, C2, C3 and C4 share one link, and transmit data 1, 2, 3 and 4, respectively. If detecting that the transmitting of certain data is completed, a transmitting device adds idle data at the end of the transmitted data, and a receiving device stops the receiving of the corresponding transmitted data when receiving the idle data.

In the prior art, a solution of TDM point-to-point is typically implemented with a transmitter end employing a ping-pong buffer mode and a receiver end employing a search mode. Specifically, an interruption is generated after transmission of data in a ping buffer is completed, and transmission of data in a pong buffer continues; at the same time, the data to be transmitted is put into the ping buffer in response to the interruption, and thus the ping and pong buffers transmit data alternately. If no further data is to be transmitted, the pong buffer inserts idle data at the end of the transmitted data. After receiving the idle data, the receiver end perceives that the receiving of data is completed and ends the receiving of data. Similarly, the receiver end employs ping and pong buffers to receive data, where the ping buffer searches for data, finds a specific frame header and receives data, and an interruption is generated after the ping buffer is full; the pong buffer continues to search for data, finds the specific frame header and receives the data, thus the ping and pong buffers receive the data alternately.

FIG. 2 is a schematic diagram of a process for transmitting data using ping and pong buffers in the TDM mode in the prior art.

As shown in FIG. 2, to transmit the combined small data, a transmitting device puts small data a, b and c into a ping buffer sequentially. If further data d and e need to be transmitted during the transmitting of data a, b and c, the remaining space of the ping buffer has to be filled with invalid data, and the data d and e are put into a pong buffer for transmitting, the remaining space of the pong buffer is also filled with invalid data, and idle data is inserted at the end of the transmitted data for transmitting together. A ping buffer of the receiving device searches for the frame header of the data, and starts to receive data a, b, and c and the invalid data. After the ping buffer is full, an interruption is provided for a pong buffer, which searches for the frame header of the data, starts to receive the data, and stops receiving the data when receiving the idle data.

During the transmitting of large data, the transmitting device puts data a into a ping buffer, and transmits the data after filling the remaining space of the ping buffer with invalid data, at this point, no further data is to be transmitted, and the transmitting device needs to fill a pong buffer with invalid data and transmit it together with an idle data inserted at the end of the transmitted data. A ping buffer of the receiving device searches for the frame header of the data and starts to receive data a and the invalid data, an interruption is provided for a pong buffer after the ping buffer is full, and the pong buffer receives the invalid data and stops receiving the data after receiving the idle data.

It can be seen from an online transmission state that a large amount of invalid data needs to be added during transmitting of either combined small data or large data.

In summary, in the prior art, during the point-to-point transmitting of data in the TDM mode, the ping and pong buffers are required to have a large space, and a large amount of invalid data needs to be added during the transmitting of data, thus the time delay of data transmission is increased and link resources are wasted; moreover, during the transmitting of data, the internal bus is always used to shift data, and thus an increased load capacity of the bus bandwidth is required.

SUMMARY OF THE INVENTION

According to an embodiment of the invention, a method and a system for transmitting data in a TDM mode are provided, to prevent the case where the receiver end and the transmitter end cannot process the data in real time in the prior art, and eliminate the long time delay of data transmission in the prior art.

An embodiment of the invention provides a method for transmitting data in a TDM mode, comprising:

A: packing, at a transmitter side, TDM frame header information and data to be transmitted into a TDM frame, and transmitting the TDM frame to a receiver side; and B: receiving, at the receiver side, the TDM frame.

An embodiment of the invention provides a system for transmitting data in a TDM mode, comprising:

a TDM transmitting module, for packing TDM frame header information and data to be transmitted into a TDM frame and transmitting the TDM frame to a receiving module; and a receiving module, for receiving the TDM frame transmitted from the TDM transmitting module.

An embodiment of the invention provides a TDM transmitting apparatus, comprising:

a transmitting interface module, for packing TDM frame header information and data to be transmitted into a TDM frame and storing the TDM frame into a transmitting storage module, where the TDM frame header information contains a port number for the data to be transmitted, and transmitting to a transmitting Buffer Descriptor (BD) ring module a transmitting address in information of the data to be transmitted;

a transmitting control module, for transmitting the TDM frame in the transmitting storage module to a receiving module according to information in the current transmitting BD stored in the transmitting BD ring module;

a transmitting BD ring module, which is a ring structure consisted of at least two transmitting BDs, for storing the received information into the current transmitting BD and setting the current state in the transmitting BD as a preparation completed state. Initially, a transmitting BD is selected at random as the current transmitting BD, and when the current state of the current transmitting BD is the preparation completed state, the next transmitting BD is set as the current transmitting BD; and a transmitting storage module, for storing the data to be transmitted.

An embodiment of the invention provides a receiving apparatus, comprising:

a Time Division Multiplexing, TDM, main receiving module, for, after receiving a TDM frame with a preset length, searching for a tag word within a window of the length, and if the tag word is found, continuing to receive the remaining TDM frame, unpacking the TDM frame, transmitting the frame header information of the TDM frame to the receiving BD ring module, and transmitting the data to a TDM receiving module according to the port number in the current receiving BD stored by the receiving BD ring module; and if the data is intended for the TDM main receiving module, transmitting a message of deleting TDM frame header information to the receiving BD ring module;

a TDM receiving module, for transmitting a message of the deleting TDM frame header information to the receiving BD ring module after receiving the data transmitted by the TDM main receiving module; and the receiving BD ring module, which is a ring structure consisted of at least two receiving BDs, for storing the received TDM frame header information into the current receiving BD, setting the current state in the current receiving BD as a preparation completed state, deleting the information in the receiving BD after receiving the message of deleting TDM frame header information, modifying the current state in the receiving BD as an idle state, initially selecting a receiving BD at random as the current receiving BD, and when the current state of the current receiving BD is the preparation completed state, setting the next receiving BD as the current receiving BD.

In the embodiments of the invention, the data is transmitted to a TDM main receiving module via a TDM transmitting module, and the TDM main receiving module transmits the data to a receiving application module, so that the receiver end and the transmitter end may process the data in real time, and the time delay of data transmission may be shortened, moreover, link resources may be saved, system overhead may be reduced, and the required load capacity of the bus bandwidth may be lowered.

DETAILED DESCRIPTION OF THE EMBODIMENTS

In view of the case where the receiver end and the transmitter end cannot process data in real time in the prior art and the long time delay of data transmission, according to the invention, the data is transmitted to a TDM main receiving module via a TDM transmitting module, and the TDM main receiving module transmits the data to a receiving application module, so that the receiver end and the transmitter end may perform real-time processing on the data, and the time delay of data transmission may be shortened.

Figure 1:
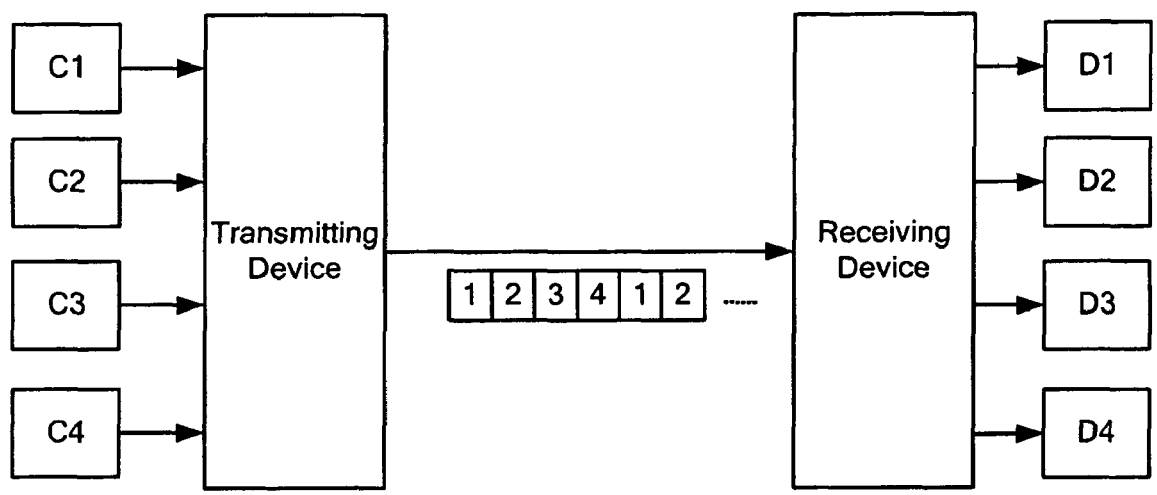
Fig.1 is a schematic diagram of a system for transmitting data in a TDM mode in the prior art.
Figure 2:
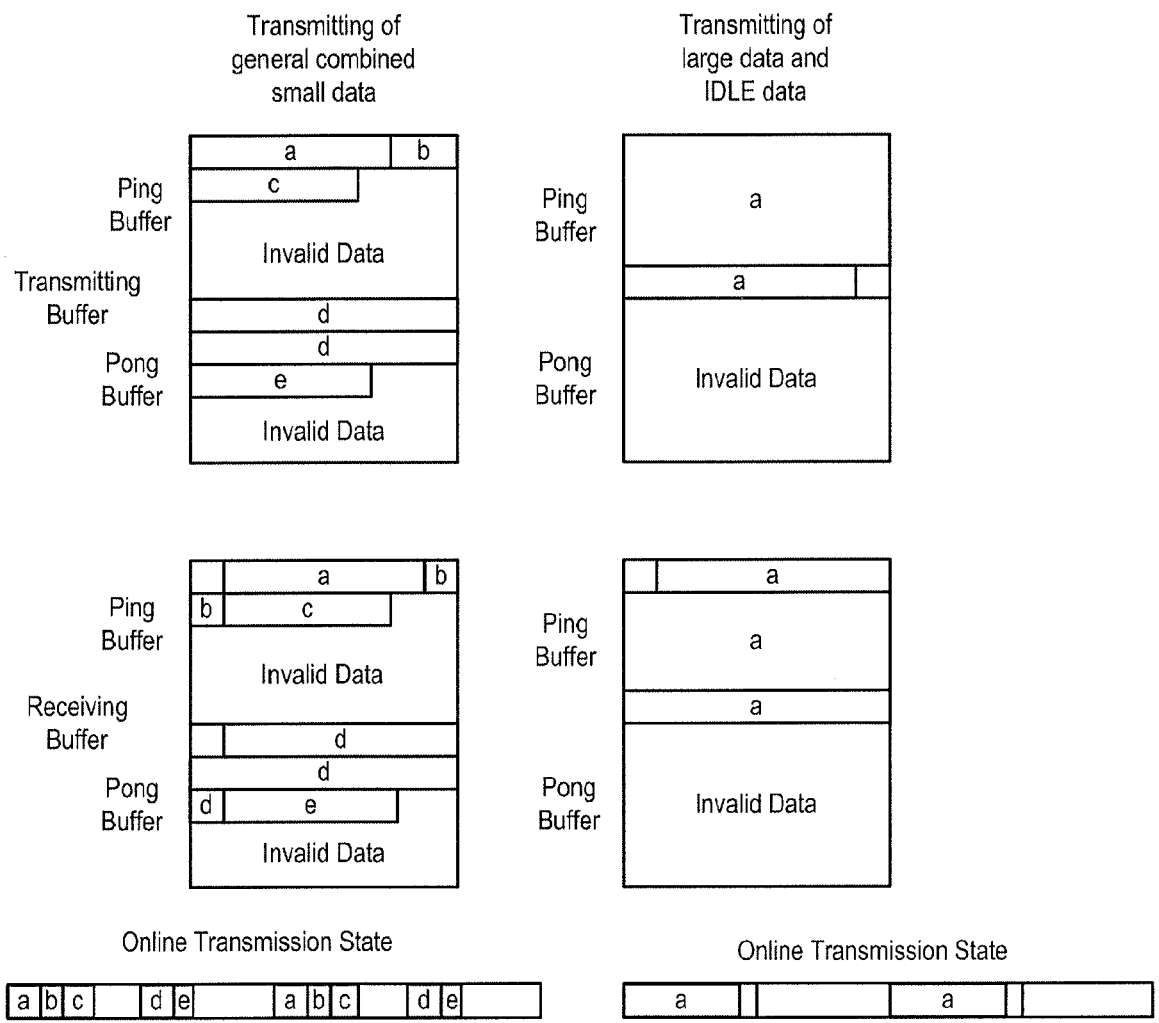
FIG. 2 is a schematic diagram showing the data transmission using ping and pong buffers in a TDM mode in the prior art.
Figure 3:
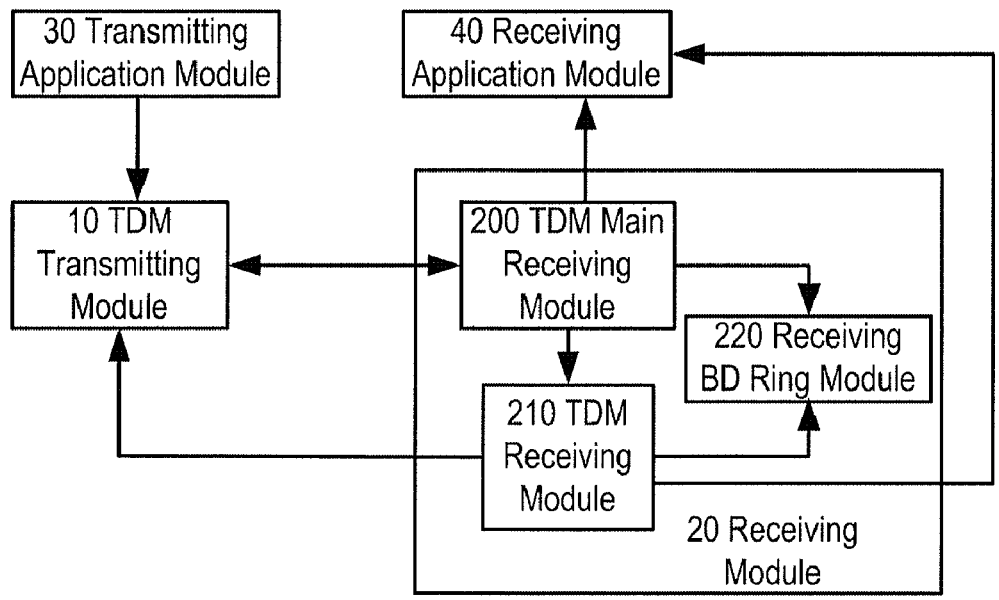
FIG. 3 is a block diagram of a system for transmitting data in a TDM mode according to an embodiment of the invention.

FIG. 3 is a block diagram of a system for transmitting data in a TDM mode according to the invention. As shown in FIG. 3, the system of the invention includes: a TDM transmitting module 10, a receiving module 20, a transmitting application module 30 and a receiving application module 40.

The TDM transmitting module 10, which is connected with the receiving module 20 and the transmitting application module 30, is used for packing TDM frame header information and data to be transmitted into a TDM frame and transmitting the TDM frame to the receiving module, after receiving the data transmitted by the transmitting application module 30.

The receiving module 20, which is connected with the TDM transmitting module 10 and the receiving application module 40, is used for receiving the TDM frame transmitted by TDM transmitting module 10, unpacking the TDM frame to obtain the data, transmitting the data to the receiving application module 40, and transmitting a receiving completed message to the TDM transmitting module 10.

The receiving module 20 further includes a TDM main receiving module 200, a TDM receiving module 210, and a receiving BD ring module 220.

The TDM main receiving module 200, which is connected with the TDM transmitting module 10, the receiving application module 40, the TDM receiving module 210 and the receiving BD ring module 220, is used for receiving a TDM frame with a preset length after the TDM frame transmitted by the TDM transmitting module 10 arrives, and searching for a tag word within a window of the length. If the tag word is found, the TDM main receiving module 200 continues to receive the remaining TDM frame, unpacks the TDM frame, transmits the information of a frame header of the TDM frame to the receiving BD ring module 220, and transmits the unpacked data to the corresponding TDM receiving module 210 according to the port number in the current receiving BD stored by the receiving BD ring module 220; and if the data is intended for the TDM main receiving module 200, the TDM main receiving module 200 transmits the data to the receiving application module 40 and transmits a message of deleting TDM frame header information to the receiving BD ring module 220.

The TDM receiving module 210, which is connected with the TDM transmitting module 10, the receiving application module 40, the TDM main receiving module 200 and the receiving BD ring module 220, is used for transmitting to the receiving application module 40 the received data transmitted by the TDM main receiving module 200 and transmitting the message of deleting TDM frame header information to the receiving BD ring module 220.

The receiving BD ring module 220, which is a ring structure consisted of at least two receiving BDs, is used for storing the received TDM frame header information into the current receiving BD, and setting the current state in the current receiving BD as a preparation completed state. The receiving BD ring module 220 deletes the information in the receiving BD after receiving the message of deleting TDM frame header information, modifies the current state in the receiving BD as an idle state. Initially, the receiving BD ring module 220 selects a receiving BD at random as the current receiving BD, and when the current state of the current receiving BD is the preparation completed state, sets the next receiving BD as the current receiving BD, if the last receiving BD is the current receiving BD, the receiving BD ring module 220 sets the receiving BD at the most front end as the next receiving BD, so that a ring structure is formed.

If the receiving module 20 includes at least two TDM receiving modules 210, the TDM receiving modules are connected with each other, and one of them is selected as the TDM main receiving module according to the predefined setting.

Figure 4:
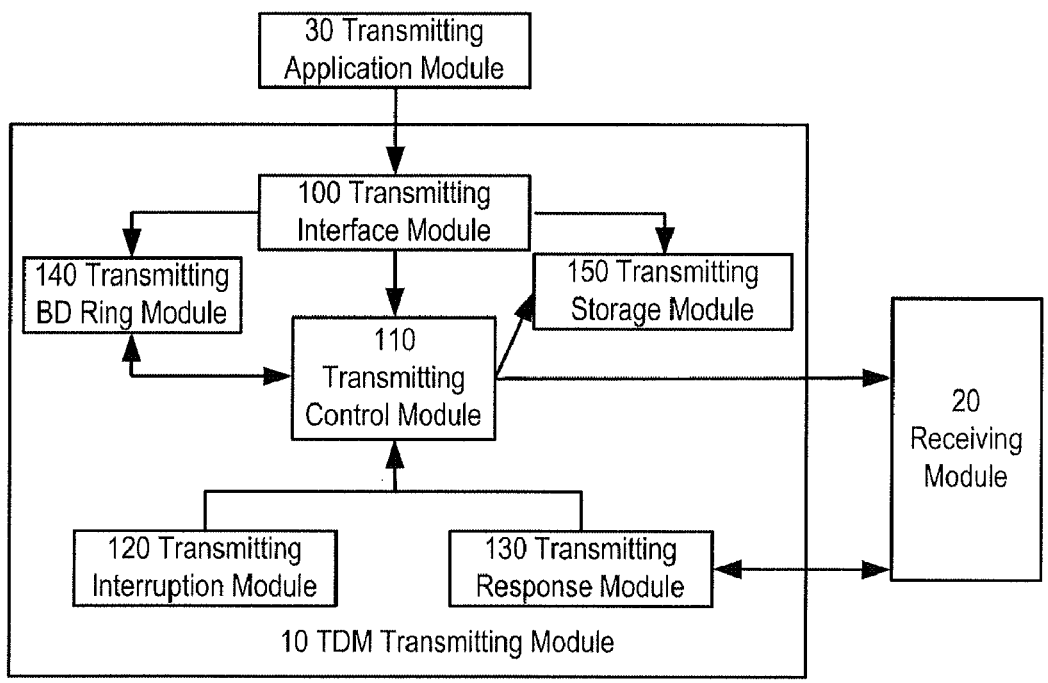
FIG. 4 is a structural block diagram of a TDM transmitting module according to an embodiment of the invention.

FIG. 4 is a structural block diagram of the TDM transmitting module according to the invention. As shown in FIG. 4, a TDM transmitting module 10 includes a transmitting interface module 100, a transmitting control module 110, a transmitting interruption module 120, a transmitting response module 130, a transmitting BD ring module 140 and a transmitting storage module 150.

The transmitting interface module 100, which is connected with a transmitting application module 30, the transmitting control module 110, the transmitting BD ring module 140 and the transmitting storage module 150, is used for calculating the capacity of the data to be transmitted according to a formula after receiving the data transmitted by the transmitting application module 30, configuring the TDM frame header information according to the information of the data to be transmitted, packing the TDM frame header information and the data to be transmitted into a TDM frame, storing the TDM frame into the transmitting storage module 150 according to the capacity calculated, transmitting to the current transmitting BD stored in transmitting BD ring module 140 the transmitting address in the information of the data to be transmitted, and transmitting a preparation completed message to the transmitting control module 110.

The transmitting control module 110, which is connected with the receiving module 20, the transmitting interface module 100, the transmitting interruption module 120, the transmitting response module 130, the transmitting BD ring module 140 and the transmitting storage module 150, is used for adding a tag word to the front of the TDM frame stored in the transmitting storage module 150 after receiving the preparation completed message transmitted by the transmitting interface module 100, transmitting the data in the transmitting storage module 150 to the receiving module 20 according to the information in the current transmitting BD stored in the transmitting BD ring module, transmitting a deleting message to the transmitting BD ring module 140 after receiving a receiving response message containing a transmitting port number that is transmitted by the transmitting response module 130, and checking whether the current state of the current transmitting BD stored in the transmitting BD ring module 140 is the preparation completed state after receiving an interruption signal transmitted by the transmitting interruption module 120; if the current state of the current transmitting BD stored in the transmitting BD ring module 140 is the preparation completed state, the transmitting control module 110 continues transmitting the data; otherwise, the transmitting control module 110 checks the current transmitting BD stored in the transmitting BD ring module 140.

The transmitting interruption module 120, which is connected with the transmitting control module 110, is used for closing the corresponding transmitting port after the transmitting of the TDM frame is completed, and transmitting an interruption signal to the transmitting control module 110.

The transmitting response module 130, which is connected with the receiving module 20 and the transmitting control module 110, is used for checking, after receiving the receiving completed message transmitted by the receiving module 20, the port number via which the message is received, and transmitting a receiving response message containing the transmitting port number to the transmitting control module 110.

The transmitting BD ring module 140, which is a ring structure consisted of at least two transmitting BDs, is used for storing the received information in the current transmitting BD, and setting the current state in the transmitting BD as a preparation completed state. The transmitting BD ring module 140 deletes the information in the transmitting BD and sets the current state in the transmitting BD as an idle state after receiving the deleting message. Initially, the transmitting BD ring module 140 selects a transmitting BD at random as the current transmitting BD, and when the current state of the current transmitting BD is the preparation completed state, sets the next transmitting BD as the current transmitting BD; if the last transmitting BD is the current transmitting BD, the transmitting BD ring module 140 sets the transmitting BD at the most front end as the next transmitting BD, so that a ring structure is formed.

The transmitting storage module 150, which is connected with the transmitting interface module 100 and the transmitting control module 110, is used for storing the data to be transmitted.

The data structure of a transmitting BD is as follows:

```
typedef struct tag_STRU_DSPTDM_TXBD
{
    u8      u8_txstat;    /*transmitting state*/
    u8      u8_rsvd;      /*reserved*/
    u16     u16_txsize;   /*capacity of data to be transmitted*/
    u32     *u32_psrc;    /*buffer address of data to be transmitted*/
} STRU_DSPTDM_TXBD;
```

| Structure Member Name | Structure Member Type | Structure Meaning | Remarks |
|---|---|---|---|
| u8_txstat | u8 | transmitting state, 0x0 by default | 1 represents ready; 0 represents not ready |

-continued

| | | | |
|---|---|---|---|
| u8_rsvd | u8 | reserved, 0x0 by default | |
| u16_txsize | u16 | capacity of data to be transmitted | an integral multiple of the minimum capacity of data to be transmitted, not exceeding the maximum length, with a unit of byte |
| u32_psrc | u32 * | buffer address of data to be transmitted | TDM receiving module |

The information of data to be transmitted is transmitted to the receiver end in a binary mode, the table below is a binary illustration of the transmitting state:

| 0 | 1 | 2 | 3 | 4 | 5 | 6 | 7 |
|---|---|---|---|---|---|---|---|
| R | — | — | — | src_cid | | dst_cid | | where, src_cid is a sequence number of the receiving control module; and dst_cid is a receiver end address.

The data structure of a TDM frame header is as follows:

```
typedef struct tag_STRU_DSPTDM_TDMHEAD
{
    u8      u8_txnum;        /*transmitting sequence
                               number*/
    u8      u8_dst_cid;      /*sequence number of
                               receiving control
                               module */
    u16     u16_size;        /*size of data to be transmitted*/
    u32     u32_checksum;    /*TDM frame header check*/
} STRU_DSPTDM_TDMHEAD;
```

| Structure Member Name | Structure Member Type | Structure Member Meaning | Remarks |
|---|---|---|---|
| u8_txnum | u8 | transmitting sequence number | cycle counter of 0~256, increased by 1 each time a frame of data is transmitted |
| u8_dst_cid | u8 | sequence number of receiving control module | 0~3 |
| u16_size | u16 | actual capacity of data to be transmitted | in the unit of byte |
| u32_checksum | u32 | TDM frame header check | IP check |

To ensure that the TDM main receiving module can receive the TDM frame header information, the minimum transmitting length minLen is defined as 96 bytes; and to avoid that the minimum length is exceeded during data receiving, a reserved buffer size resvLen is defined as 96 bytes. During data transmitting, the transmitting interface module calculates the capacity of data to be transmitted according to the following formulas:

bufLen=(dataLen/minLen)*minLen+resvLen;
    (dataLen/minLen is 0)

bufLen=(dataLen/minLen+1)*minLen+resvLen;
    (dataLen/minLen is not 0)

The receiver end also calculates the actual capacity of the received data according to the formulas above.

Figure 5:
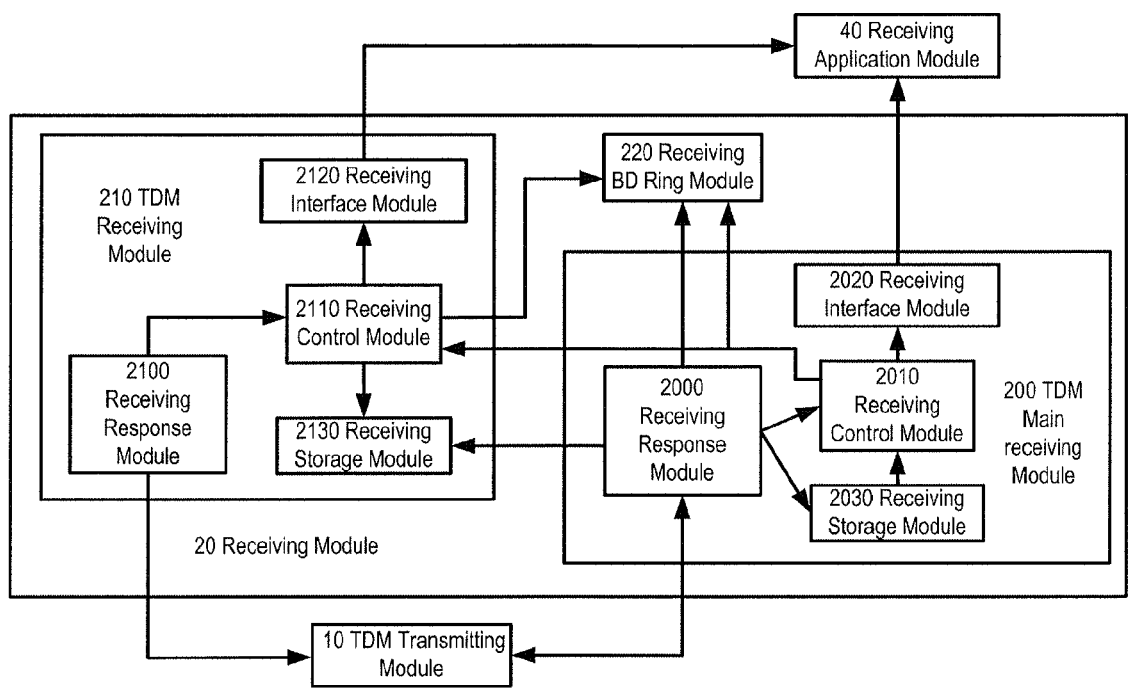
FIG. 5 is a structural block diagram of a TDM main receiving module and a TDM receiving module according to an embodiment of the invention.

FIG. 5 is a structural block diagram of the TDM main receiving module and the TDM receiving module according to the invention. As shown in FIG. 5, a TDM main receiving module 200 includes a receiving response module 2000, a receiving control module 2010, a receiving interface module 2020 and a receiving storage module 2030.

The receiving response module 2000, which is connected with a TDM transmitting module 10, a TDM receiving module 210, a receiving BD ring module 220, the receiving control module 2010 and the receiving storage module 2030, is used for receiving a TDM frame with a preset length after the TDM frame transmitted by the TDM transmitting module 10 arrives, and searching for a tag word within a window of the length; if the tag word is found, the receiving response module 2000 continues to determine whether the data received has a length larger than the preset length; if the data received has a length larger than the preset length, the receiving response module 2000 continues to receive the remaining TDM frame and unpacks the TDM frame, transmits information of the frame header of the TDM frame to the receiving BD ring module 220, and transmits the data to the corresponding TDM receiving module 210 according to the port number in the current receiving BD stored by the receiving BD ring module 220; and if the data is intended for the TDM main receiving module 200, the receiving response module 2000 stores the data in the receiving storage module 2030 and transmits a receiving message to the receiving control module 2010; if there exists no tag word within the window of the length, the receiving response module 2000 stops receiving the TDM frame and transmits an alarm message to the TDM transmitting module 10.

The receiving control module 2010, which is connected with the TDM receiving module 210, the receiving BD ring module 220, the receiving response module 2000, the receiving interface module 2020 and the receiving storage module 2030, is used for checking whether the data is intended for the TDM main receiving module 200 according to the TDM frame header information in the current receiving BD after receiving the receiving message transmitted by receiving response module 2000; if the data is not intended for the TDM main receiving module 200, the receiving control module 2010 transmits the receiving message to the corresponding TDM receiving module 210; otherwise, the receiving control module 2010 calculates the actual size of the data stored in the receiving storage module 2030 according to the information in the corresponding receiving BD stored by the receiving BD ring module, transmits the data to the receiving interface module 2020, transmits a message of deleting TDM frame header information to the receiving BD ring module, and checks whether the current state of the current receiving BD stored in the receiving BD ring module 220 is a preparation completed state; if the current state of the current receiving BD stored in the receiving BD ring module 220 is the preparation completed state, the receiving control module 2010 continues to transmit the data according to the sequence number of the receiving module in the current receiving BD stored by the receiving BD ring module 220; otherwise, the receiving control module 2010 continues checking the current state of the current receiving BD stored in the receiving BD ring module 220.

The receiving interface module 2020, which is connected with the receiving control module 2010 and a receiving application module 40, is used for transmitting, after receiving the data transmitted by the receiving control module 2010, the data to the receiving application module 40.

The receiving storage module 2030, which is connected with the receiving response module 2000 and the receiving control module 2010, is used or storing the data received.

The TDM receiving module 210 includes a receiving response module 2100, a receiving control module 2110, a receiving interface module 2120 and a receiving storage module 2130.

The receiving response module 2100, which is connected with the TDM transmitting module 10 and the receiving control module 2110, is used for transmitting a receiving completed message to the TDM transmitting module 10 after receiving a completion message transmitted by the receiving control module 2110.

The receiving control module 2110, which is connected with the TDM main receiving module 200, the receiving BD ring module 220, the receiving response module 2100, the receiving interface module 2120 and the receiving storage module 2130, is used for calculating the actual size of the data stored in the receiving storage module 2130 according to the TDM frame header information in the corresponding receiving BD stored by the receiving BD ring module 220 after receiving the receiving message transmitted by the TDM main receiving module 200, transmitting the data to the receiving interface module 2120, transmitting a message of deleting TDM frame header information to the receiving BD ring module 220, and transmitting the completion message to the receiving response module 2100.

The receiving interface module 2120, which is connected with the receiving control module 2110 and the receiving application module 40, is used for transmitting the received data transmitted by the receiving control module 2110 to the receiving application module 40.

The receiving storage module 2130, which is connected with the TDM main receiving module 200 and the receiving control module 2110, is used for storing the data transmitted by the TDM main receiving module 200.

The data structure of the receiving BD is as follows:

```
typedef struct tag_STRU_DSPTDM_RXBD
{
    u8      u8_rxstat;      /*receiving state*/
    u8      u8_rxnum;       /*sequence number of the received frame
                              on the tdm link*/
    u16     u16_rxsize;     /*size of received data*/
    u32     *pu32_psrc;     /*buffer address of received data*/
} STRU_DSPTDM_RXBD;
```

| Structure Member Name | Structure Member Type | Structure Member Meaning | Remarks |
|---|---|---|---|
| u8_rxstat | U8 | receiving state, 0x0 by default | 1 represents ready; 0 represents not ready |
| u8_rxnum | U8 | receiving sequence number | cycle counter of 0~256, increased by 1 each time a frame of data is transmitted |
| u16_rxsize | U16 | actual size of data received | in the unit of byte |
| pu32_psrc | u32* | buffer address of data received | TDM mapping address |

The information of the received data is stored in a binary mode, and the table below is a binary illustration of receiving states:

| 0 | 1 | 2 | 3 | 4 | 5 | 6 | 7 |
|---|---|---|---|---|---|---|---|
| R | — | — | — | — | — | tdmid | | where, tdmid is a transmitter end address.

Figure 6:
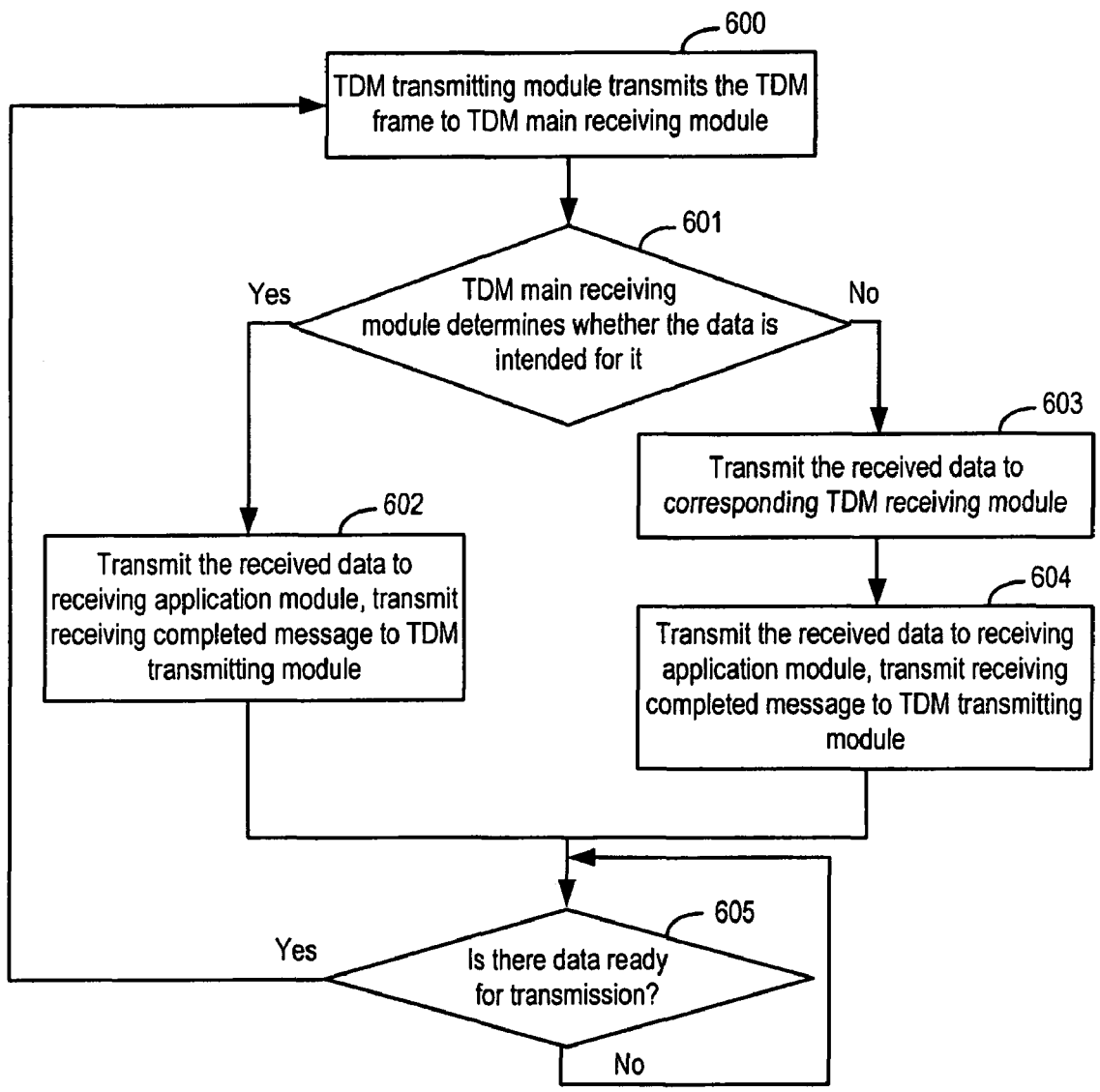
FIG. 6 is a schematic flow chart of a method for transmitting data in a TDM mode according to an embodiment of the invention.

FIG. 6 is a schematic flow chart of a method for transmitting data in a TDM mode according to the invention. As shown in FIG. 6, the method of the invention includes the following.

Process 600: A TDM transmitting module packs TDM frame header information and data to be transmitted into a TDM frame, and transmitting the TDM frame to a TDM main receiving module.

Process 601: The TDM main receiving module unpacks the received TDM frame, and determines whether the data is intended for the TDM main receiving module; if the data is intended for the TDM main receiving module, Process 602 is performed; otherwise, Process 603 is performed.

Process 602: The TDM main receiving module transmits the received data to a receiving application module, and transmits a receiving completed message to the TDM transmitting module.

Process 603: The TDM main receiving module transmits the received data to the corresponding TDM receiving module.

Process 604: The TDM receiving module transmits the received data to the receiving application module, and transmits the receiving completed message to the TDM transmitting module.

Process 605: The TDM transmitting module determines whether there exists data to be transmitted after receiving the receiving completed message; and if there exists data to be transmitted, Process 600 is performed; otherwise, the method returns to Process 605.

Figure 7:
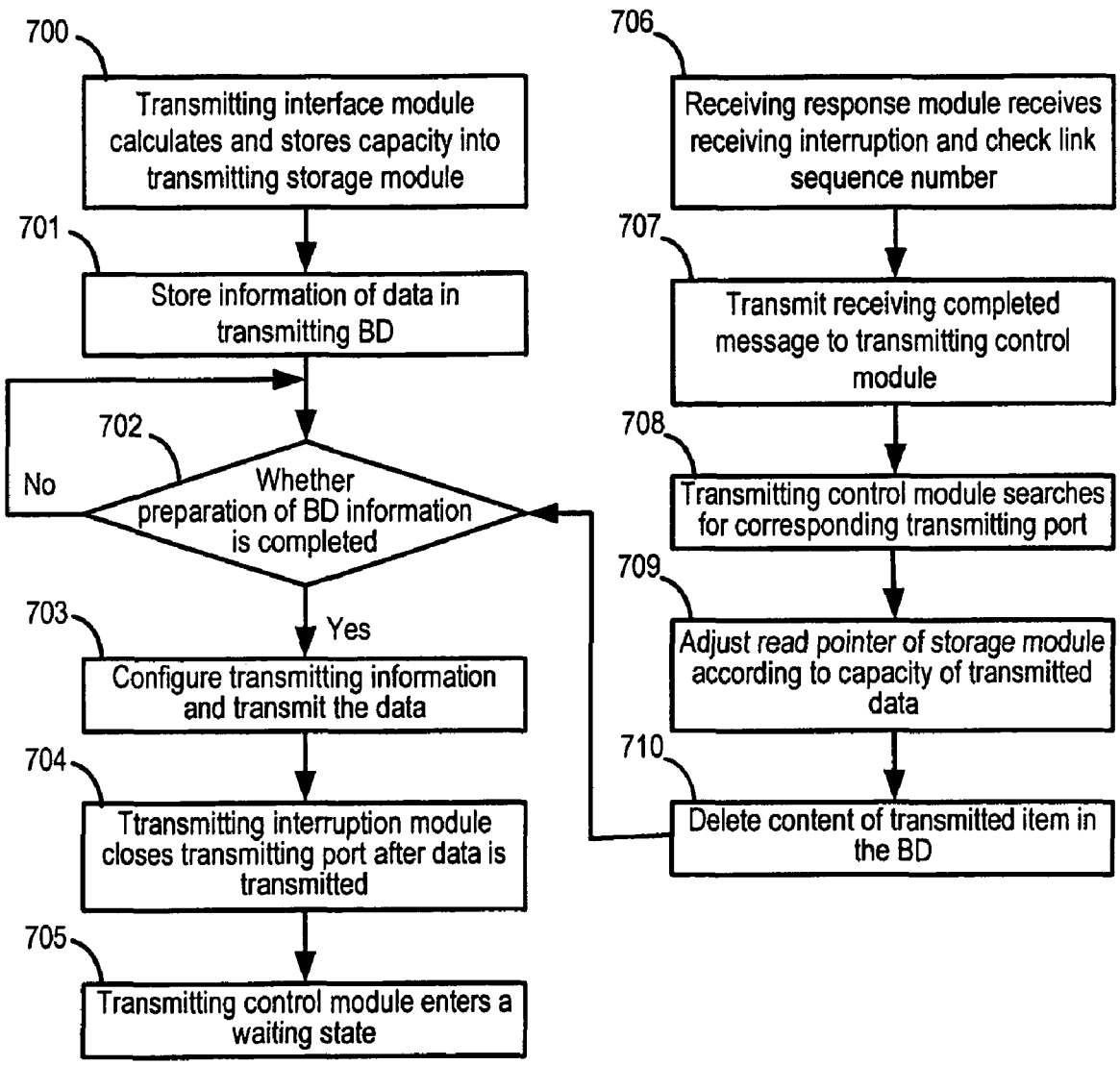
FIG. 7 is a general schematic flow chart of transmitting data by a transmitting apparatus according to an embodiment of the invention.

FIG. 7 is a general schematic flow chart of transmitting data by the transmitting apparatus according to the invention. As shown in FIG. 7, the process in which the transmitting apparatus transmits data includes the following.

Process 700: After receiving the data transmitted by a transmitting application module, a transmitting interface module calculates the capacity of the data to be transmitted according to a formula, configures TDM frame header information according to information of the data, packs the TDM frame header information and the data to be transmitted into a TDM frame, and storing the TDM frame into a transmitting storage module according to the capacity calculated.

Process 701: The transmitting interface module transmits the information of the data to be transmitted to a transmitting BD ring module, and the transmitting BD ring module stores the information of the data to be transmitted in the current transmitting BD, sets the state of the transmitting BD as a preparation completed state, and transmits a preparation completed message to a transmitting control module.

Process 702: The transmitting control module checks whether the current transmitting BD in the transmitting BD ring module is at the preparation completed state after receiving the preparation completed message; and if the current transmitting BD in the transmitting BD ring module is at the preparation completed state, Process 703 is performed; otherwise, the process returns to Process 702.

Process 703: The transmitting control module adds a tag word to the front of the TDM frame in the transmitting storage module, and transmits the data in the transmitting storage module according to the information in the current transmitting BD stored in the transmitting BD ring module, and the transmitting BD ring module sets the next transmitting BD as the current transmitting BD.

Process 704: A transmitting interruption module closes the corresponding transmitting port after the data transmission is completed, and transmits an interruption signal to the transmitting control module.

Process 705: The transmitting control module enters a waiting state after receiving the interruption signal.

Process 706: A transmitting response module checks the link sequence number of the corresponding transmitting port after receiving a receiving completed message transmitted by a TDM receiving module.

Process 707: The transmitting response module transmits a receiving response message containing the link sequence number to the transmitting control module.

Process 708: The transmitting control module searches for the data transmitted by the corresponding transmitting port according to the link sequence number after receiving the receiving response message.

Process 709: The transmitting control module adjusts the read pointer of the transmitting storage module according to the capacity of the data transmitted.

Process 710: The transmitting control module transmits a deleting message to the transmitting BD ring module, and the transmitting BD ring module deletes the information in the stored transmitting BD of the data transmitted, and sets the state of the transmitting BD as idle state.

Figure 8:
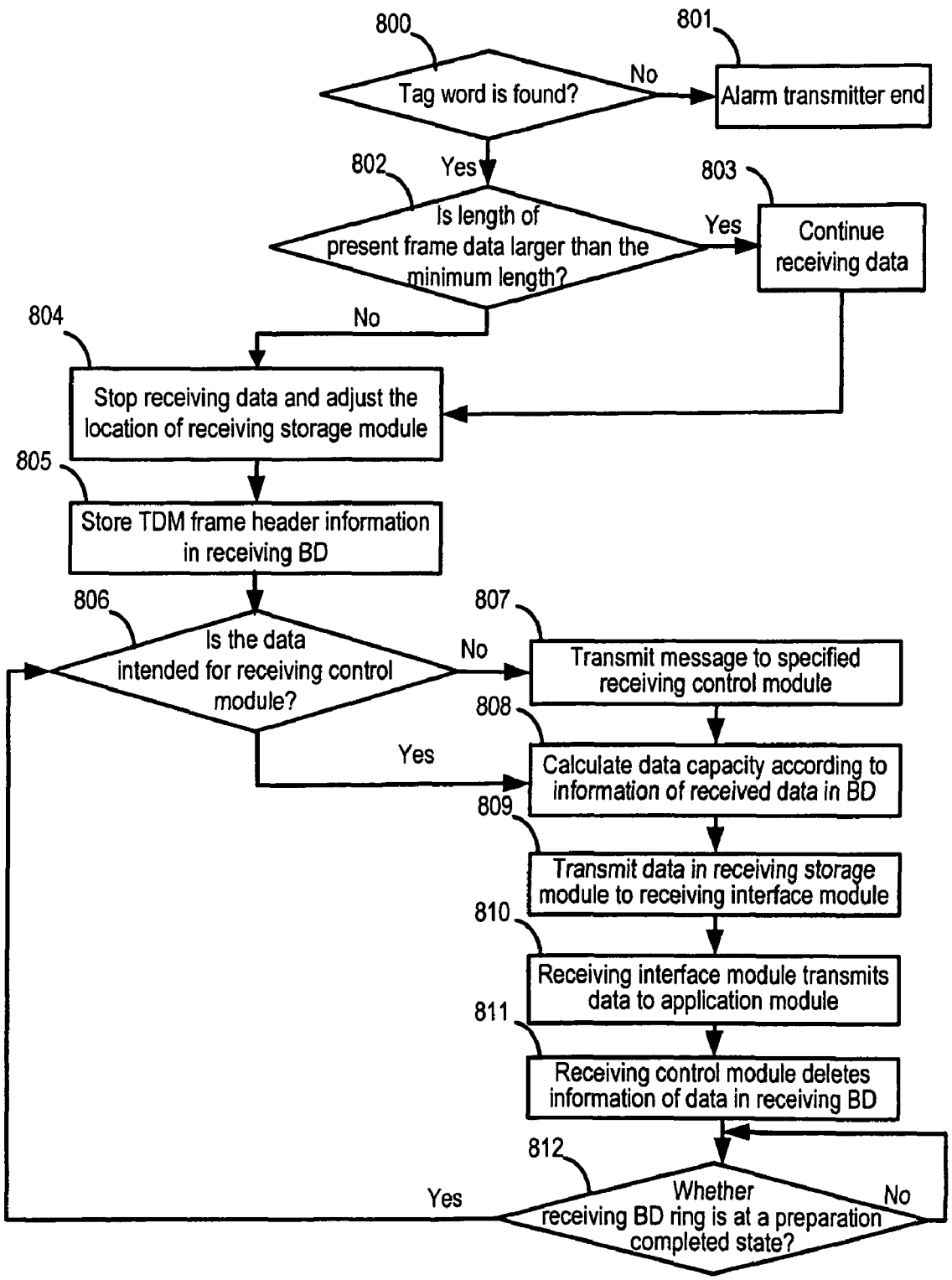
FIG. 8 is a general schematic flow chart of receiving data by a receiving apparatus according to an embodiment of the invention.

FIG. 8 is a general schematic flow chart of receiving data by the receiving apparatus according to the invention. As shown in FIG. 8, the process in which the receiving apparatus receives data includes the following.

Process 800: After receiving a TDM frame with a preset length, a receiving response module searches for a tag word within a window of the length; and if the tag word is found, Process 802 is performed; otherwise, Process 801 is performed.

Process 801: The receiving response module stops the receiving of data, and transmits an alarm information to the transmitter end.

Process 802: The receiving response module determines whether the received data has a length larger than the preset length according to the TDM frame header information; and if the received data has a length larger than the preset length, Process 803 is performed; otherwise, Process 804 performed.

Process 803: The receiving response module continues receiving the TDM frame.

Process 804: After completing the receiving of the data, the receiving response module stops the receiving of the data, unpacks the TDM frame received, and transmits the frame header information of the TDM frame to a receiving BD ring module, and the receiving BD ring module stores the information to the current receiving BD stored by the receiving BD ring module, sets the current state of the receiving BD as a preparation completed state, and adjusts the location of a receiving storage module in the corresponding TDM receiving module according to the TDM frame header information.

Process 805: The receiving response module puts the received data into the corresponding receiving storage module according to the information in the current receiving BD stored by the receiving BD ring module, and transmits a receiving message to a receiving control module in a TDM main receiving module.

If the data is intended for the TDM main receiving module, the receiving response module in the TDM main receiving module transmits a receiving completed message to the transmitter end after transmitting the receiving message to the receiving control module in the TDM main receiving module.

Process 806: After receiving the receiving message, the receiving control module determines whether the data is intended for the TDM main receiving module according to the TDM frame header information stored in the information in the current receiving BD stored by the receiving BD ring module; and if the data is intended for the TDM main receiving module, Process 808 is performed; otherwise, Process 807 is performed.

Process 807: The receiving control module transmits the receiving message to the receiving control module in the corresponding TDM receiving module.

Process 808: The receiving control module calculates the actual size of the data according to the information in the current receiving BD stored by the receiving BD ring module.

Process 809: The receiving control module transmits the data in the receiving storage module to a receiving interface module according to the actual size.

Process 810: After receiving the data, the receiving interface module transmits the data to a receiving application module, and the receiving BD ring module sets the next receiving BD as the current receiving BD.

Process 811: The receiving control module transmits a deleting message to the receiving BD ring module after transmitting the data to the receiving interface module, and the receiving BD ring module deletes the information in the receiving BD of the transmitted data that is stored, and sets the current state of the receiving BD as idle state.

If the data is intended for the TDM main receiving module, the receiving control module in the TDM main receiving module performs Process 812.

If the data is intended for the TDM receiving module, the receiving control module in the TDM receiving module transmits a completion message to the receiving response module after the receiving BD ring module sets the current state of the receiving BD as idle state, and the receiving response module transmits a receiving completed message to the transmitter end after receiving the completion message.

Process 812: The receiving control module determines whether the current state of the current receiving BD stored by the receiving BD ring module is the preparation completed state; and if the current state of the current receiving BD stored by the receiving BD ring module is the preparation completed state, Process 806 is performed; otherwise, the process returns to Process 812.

Of course, one skilled in the art may make various modifications and variations to the present invention without deviating from the scope of the present invention. Accordingly, if these modifications and variations to the present invention fall in the scope of the claims of the present invention and its equivalents, the present invention intends to include these modifications and variations.

The invention claimed is:

1. A method for transmitting data in a Time Division Multiplexing, TDM, mode, the method comprising:
    providing at a transmitter side at least two transmitting Buffer Descriptors, BDs, which are of a ring structure and each of which comprises current state information, the method comprising:
    A: selecting initially a transmitting BD at random as a current transmitting BD, packing, at the transmitter side, TDM frame header information and data to be transmitted into a TDM frame, sequentially searching, at the transmitter side, the transmitting BDs, storing a transmitting address in information of the data to be transmitted into the current transmitting BD, setting a current state in the transmitting BD as a preparation completed state, setting the next transmitting BD as the current transmitting BD, and transmitting the TDM frame to a receiver side according to the transmitting address in the transmitting BD; and B: receiving, at the receiver side, the TDM frame.

2. The method according to claim 1, wherein, the receiver side comprises at least two receiving BDs, which are of a ring structure and each of which comprises the current state information, and initially a receiving BD is selected at random as a current receiving BD, and process A further comprises:

adding, at the transmitter side, a tag word to the front of the TDM frame to be transmitted to the receiver side, wherein the TDM frame header information comprises a port number of the receiver side;

and process B comprises:

B1: after receiving a TDM frame with a preset length, searching, at the receiver side, the tag word within a window length, and if the tag word is found, continuing to receive the remaining TDM frame, unpacking the TDM frame, storing the frame header information of the TDM frame into the current receiving BD, setting the current state in the receiving BD as a preparation completed state, and setting the next receiving BD as the current receiving BD; if the tag word is not found, stopping the receiving of the TDM frame and transmitting an alarm information to the transmitter side;

B2: transmitting, at the receiver side, the data to a corresponding receiving port according to the port number in the receiving BD, deleting the information in the receiving BD, and modifying the current state in the receiving BD as an idle state.

3. The method according to claim 2, wherein the method further comprises, after process B:

C: transmitting, at the receiver side, a receiving completed message to the transmitter side; and D: checking, at the transmitter side, whether the current state information of the current transmitting BD is the preparation completed state, and if the current state information of the current transmitting BD is the preparation completed state, performing process A; otherwise, returning to process D.

4. The method according to claim 3, wherein the method further comprises, after process C:

C1: checking, at the receiver side, whether the current state of the current receiving BD is the preparation completed state, and if the current state of the current receiving BD is the preparation completed state, performing process B; otherwise, returning to process C1.

5. The method according to claim 4, wherein, in process B1, after receiving the TDM frame with the preset length, the receiver side stops receiving the TDM frame and transmits an alarm message to the transmitter side if no tag word is found within the window length.

6. A Time Division Multiplexing, TDM, transmitting apparatus, comprising:

a transmitting interface module, for packing TDM frame header information and data to be transmitted into a TDM frame and storing the TDM frame into a transmitting storage module, wherein the TDM frame header information comprises a port number of a receiver side, and transmitting to a transmitting Buffer Descriptor, BD, ring module a transmitting address in information of the data to be transmitted;

a transmitting control module, for transmitting the TDM frame in the transmitting storage module to a receiving module according to information in a current transmitting BD stored in the transmitting BD ring module;

the transmitting BD ring module, which is a ring structure consisted of at least two transmitting BDs, for storing the transmitting address into the current transmitting BD, setting a current state in the transmitting BD as a preparation completed state, initially selecting a transmitting BD at random as the current transmitting BD, and when the current state of the current transmitting BD is the preparation completed state, setting the next transmitting BD as the current transmitting BD; and the transmitting storage module, for storing the TDM frame.

7. The apparatus according to claim 6, wherein, the TDM transmitting apparatus further comprises:

a transmitting interruption module, for closing a corresponding transmitting port and transmitting an interruption signal to the transmitting control module, after the transmitting control module completes the transmission of the TDM frame; and a transmitting response module, for, after receiving a receiving completed message, checking the port number via which the message is received, and transmitting a receiving response message containing the port number to the transmitting control module.

8. The apparatus according to claim 7, wherein, the transmitting control module is further used for:

adding a tag word to a front of the TDM frame stored in the transmitting storage module, transmitting a deleting message to the transmitting BD ring module after receiving the receiving response message containing the transmitting port number transmitted by the transmitting response module, and checking whether the current state of the current transmitting BD stored in the transmitting BD ring module is a preparation completed state after receiving the interruption signal transmitted by the transmitting control interruption module, and if the current state of the current transmitting BD is the preparation completed state, continuing transmitting the data; otherwise, checking the current transmitting BD stored in the transmitting BD ring module; and the transmitting BD ring module is further used for:

deleting the information in the transmitting BD and setting the current state in the transmitting BD as an idle state, after receiving the deleting message.

9. A receiving apparatus, comprising:

a Time Division Multiplexing, TDM, main receiving module, for searching for a tag word within a window length after receiving a TDM frame with a preset length, and if the tag word is found, continuing to receive the remaining TDM frame, unpacking the TDM frame, transmitting frame header information of the TDM frame to a receiving Buffer Descriptor, BD, ring module, and transmitting data to a TDM receiving module according to a port number in a current receiving BD stored by the receiving BD ring module; and if the data is intended for the TDM main receiving module, transmitting a message of deleting TDM frame header information to the receiving BD ring module;

the TDM receiving module, for transmitting a message of deleting TDM frame header information to the receiving BD ring module after receiving the data transmitted by the TDM main receiving module; and the receiving BD ring module, which is a ring structure consisted of at least two receiving BDs, for storing the received TDM frame header information into the current receiving BD, setting a current state in the current receiving BD as a preparation completed state, deleting the information in the receiving BD after receiving the message of deleting TDM frame header information, modifying the current state in the receiving BD as an idle state, initially selecting a receiving BD at random as the current receiving BD, and when the current state of the current receiving BD is the preparation completed state, setting the next receiving BD as the current receiving BD.

10. The apparatus according to claim 9, wherein, the TDM main receiving module comprises:

a receiving response module, for searching for the tag word within the window length after receiving the TDM frame with the preset length, and if the tag word is found, continuing to receive the remaining TDM frame, unpacking the TDM frame, transmitting the frame header information of the TDM frame to the receiving BD ring module, and transmitting the data to the corresponding TDM receiving module according to the port number in the current receiving BD stored by the receiving BD ring modulem; and if the data is intended for the TDM main receiving module, transmitting the message of deleting TDM frame header information to the receiving BD ring module;

a receiving control module, for determining whether the data is intended for the TDM main receiving module according to the port number in the receiving BD stored by the receiving BD ring module after receiving a receiving message transmitted by the receiving response module, and if the data is intended for the TDM main receiving module, transmitting the data in a receiving storage module to a receiving interface module, and transmitting the message of deleting TDM frame header information to the receiving BD ring module; and the receiving storage module, for storing the data transmitted by the receiving response module.

11. The apparatus according to claim 10, wherein, the TDM main receiving module further comprises:

the receiving interface module, for transmitting the data to a receiving application module after receiving the data transmitted by the receiving control module.

12. The apparatus according to claim 10, wherein, the receiving response module is further used for:

after receiving the TDM frame with the preset length, stopping receiving the TDM frame and transmitting an alarm message to a TDM transmitting module which transmits the TDM frame, if no tag word is found within the window length; and the receiving control module is further used for:

checking whether the current state of the current receiving BD stored by the receiving BD ring module is the preparation completed state after transmitting the message of deleting TDM frame header information to the receiving BD ring module, and if the current state of the current receiving BD is the preparation completed state, continuing transmitting the data according to the port number in the current receiving BD stored by the receiving BD ring module; otherwise, checking the current state of the current receiving BD stored by the receiving BD ring module.

13. The apparatus according to claim 9, wherein, the TDM receiving module comprises:

a receiving control module, for transmitting the data in a receiving storage module to a receiving interface module and transmitting a message of deleting TDM frame header information to the receiving BD ring module, after receiving a receiving message transmitted by the TDM main receiving module; and the receiving storage module, for storing the data transmitted by the TDM main receiving module.

14. The apparatus according to claim 13, wherein, the receiving control module is further used for:

transmitting a completion message to a receiving response module after transmitting the message of deleting TDM frame header information to the receiving BD ring module; and the TDM receiving module further comprises:

the receiving response module, for transmitting a receiving completed message to a TDM transmitting module, which transmits the TDM frame after receiving the completion message transmitted by the receiving control module; and the receiving interface module, for transmitting the data to a receiving application module after receiving the data transmitted by the receiving control module.

\* \* \* \* \*

UNITED STATES PATENT AND TRADEMARK OFFICE
CERTIFICATE OF CORRECTION

PATENT NO. : 8,050,294 B2  Page 1 of 1
APPLICATION NO. : 12/515799
DATED : November 1, 2011
INVENTOR(S) : Changwang Guo et al.

It is certified that error appears in the above-identified patent and that said Letters Patent is hereby corrected as shown below:

Title page, Item (73), Assignee: "Datang Mobile Communications Equipment Co., Ltd." should read
--China Academy of Telecommunications Technology--

Signed and Sealed this
Thirteenth Day of March, 2012

David J. Kappos
*Director of the United States Patent and Trademark Office*